United States Patent [19]

Yamada

[11] Patent Number: 5,715,285
[45] Date of Patent: Feb. 3, 1998

[54] DATA TRANSMISSION APPARATUS, A DATA RECEIVING APPARATUS, AND A DATA TRANSMISSION SYSTEM

[75] Inventor: Kazuya Yamada, Tokyo, Japan

[73] Assignee: Victor Company Of Japan, Ltd., Japan

[21] Appl. No.: 573,301

[22] Filed: Dec. 15, 1995

[30] Foreign Application Priority Data

Dec. 26, 1994 [JP] Japan .................................. 6-337174

[51] Int. Cl.$^6$ .................................................. H03D 3/24
[52] U.S. Cl. ............................................ 375/376; 370/395
[58] Field of Search ............................... 375/211, 219, 375/220, 221, 376, 372; 370/395, 465, 468, 509, 513; 395/250; 455/51.1

[56] References Cited

U.S. PATENT DOCUMENTS

| Re. 33,380 | 10/1990 | Cheng-Quispe et al. | 375/220 |
|---|---|---|---|
| 3,953,673 | 4/1976 | Dorward | 375/211 |
| 5,115,451 | 5/1992 | Furlong | 375/221 |
| 5,479,445 | 12/1995 | Kloker et al. | 375/220 |
| 5,493,583 | 2/1996 | Cripps | 375/219 |
| 5,566,204 | 10/1996 | Kardontchik et al. | 375/219 |

OTHER PUBLICATIONS

ISO/IEC 13818-1: DIS; Jun. 11, 1994; pp., 13-16 and 98-102.

*Primary Examiner*—Stephen Chin
*Assistant Examiner*—Joseph Roundtree
*Attorney, Agent, or Firm*—Rossi & Associates

[57] ABSTRACT

In a data transmission system having a transmission apparatus and a receiving apparatus through a network which supplies first and second network clock signals to the transmission and receiving apparatus respectively, synchronizing signal generation portions in both apparatus generate first and second periodical signals generated from the first and second network clock signals having a constant phase relation therebetween. The transmission apparatus generates time information indicating a data encoding timing according to a system clock signal of the transmission apparatus and supplies the time information in response to the first periodical signal and transmits the time information with data to be transmitted to the receiving apparatus. The receiving apparatus detects and holds the time information and uses it for controlling a PLL circuit for generating a system clock signal of the receiving apparatus such that the system clock signal of the transmission apparatus is substantially in phase with that of the receiving apparatus. When an error in the PLL circuit is larger than a controllable range, the time information is loaded into a counter in the PLL circuit. Thus, the PLL circuit operates correctly when there is a jitter of the transmitting data which occurs on packetting data in the ATM network.

5 Claims, 10 Drawing Sheets

DATA TRANSMISSION APPARATUS, A DATA RECEIVING APPARATUS, AND A DATA TRANSMISSION SYSTEM

BACKGROUND OF THE INVENTION

1. Field of the Invention

This invention relates to a data transmission system, a data receiving apparatus, and a data transmission system including the data transmission apparatus and data receiving apparatus, wherein the transmission apparatus operates on the basis of a system clock signal, has an encoder For encoding data, and transmits data and time information indicative of an instance of encoding the data and a receiving apparatus has a decoder for decoding the transmitted data and a clock signal reproducing circuit for recovering the system clock signal in accordance with the time information received from the transmission apparatus.

2. Description of the Prior Art

A data transmission system, employing a high efficiency encoding system of a digital signal, which comprises a data transmission apparatus for transmitting data and time information concerning to the data and data receiving apparatus for receiving the data and the time information is known. This data transmission apparatus operates on the basis of a system clock signal has an encoder for encoding data the data and time information indicative of an instance of encoding the data. The receiving apparatus has a decoder for decoding the transmitted data and a clock signal reproducing circuit for recovering the system clock signal in accordance with the time information.

Generally, the MPEG (Moving Picture Experts Group) system standard requires that time information indicative of an instance of encoding should be inserted into the transmitted data more than ten times per second. When this time information is transmitted, an encoder makes the time information formatted in accordance with the system clock signal having a frequency of 27 MHz. Therefore, differences between the respective time information also represent time differences between the instances when the data is transmitted. Therefore, the recovering of the time information requires that the time relation between the consecutively transmitted data does not change.

A decoder recovers the system clock signal having the frequency of 27 MHz with a PLL (Phase Locked Loop) circuit in accordance with the received time information. FIG. 6 is a block diagram of a prior art PLL circuit used in a prior art decoder. The PLL circuit comprises a counter 1 for counting the system clock signal 5, a comparator 2 for comparing the time information with the counted value, a filter and d/a converter 3 for filtering the output of the comparator 2 and d/a converting the output of the comparator 2, and a voltage controlled crystal oscillator (VCX0) 4 for oscillating with the frequency controlled in accordance with an output of the filter and d/a converter 3. The counter 1 counts pulses in the system clock 5 and the comparator 2 compares the counts and the received time information to reproduce a difference signal. The difference is converted into a voltage signal by the d/a converter 3 included in a filter and d/a converting circuit via the filter included therein. The voltage controlled oscillator 4 oscillates around 27 MHz and the frequency is controlled in accordance with the received time information loaded in the counter 1 in response to a load timing signal generated from the system clock signal 5 from the voltage controlled oscillator 4 through a load timing signal generator 6. Therefore, the output of the voltage controlled oscillator 4 represents the recovered system clock of the encoder.

FIG. 7 is an illustration of a prior art transmission system for effecting a high speed packet transmission of data in the ATM (Asynchronous Transfer Mode) through a network in the case that only one transmission apparatus 7 transmits data. FIG. 8 is a diagram of a time chart of data transmission and data receiving by a prior art data transmission system in the case that only one transmission apparatus 7 transmits data. FIG. 9 is an illustration of a prior art transmission system for effecting a high speed packet transmission of data in the asynchronous transfer mode (ATM) through the network in the case that a plurality of transmission apparatus 7a to 7d transmit data at the same time. FIG. 10 is a diagram of a diagram of a time chart of data transmission and data receiving by the prior art data transmission system in the case that a plurality of data transmission apparatus 7a to 7d transmit data.

If only one terminal 7a transmits data and another terminal 8a receives the data, it is possible to receive the data with the time base recovered as shown in FIG. 8.

However, if a plurality of terminals 7a to 7d transmit data at the same time, a jitter may occur in the receiving data as shown in FIG. 9 because a packet transmitted by the transmission 7a is supplied to the receiving apparatus 8a with the packet directed to the receiving apparatus 8a combined with packets directed to other receiving apparatus 8b and 8c, etc. into a block of packets and the order of arranging the packets in the block is not predetermined. Therefore, the combined packet has a jitter in accordance to the position in the block and the time intervals between the consecutive time information are not kept as shown in FIG. 10.

Accordingly, there is a problem that the time recovering is inaccurate in the transmission system transmitting data in the asynchronous transmission mode. Therefore, the PLL circuit operates incorrectly.

SUMMARY OF THE INVENTION

The present invention has been developed in order to remove the above-described drawbacks inherent to the conventional data transmission system, the conventional data transmission apparatus, and the conventional data receiving apparatus.

The aim of this invention is that, in a data transmission system including the data transmission apparatus and data receiving apparatus, wherein the transmission apparatus operates on the basis of a system clock signal, has an encoder for encoding data, and transmits data and time information periodically indicating an instance of encoding the data and a receiving apparatus has a decoder for decoding the transmitted data and a clock signal reproducing circuit for recovering the system clock signal in accordance with the time information received from the transmission apparatus, though there are much traffic on the network and the time intervals between consecutive packets vary, the PLL circuit in the data receiving apparatus correctly operates to recover the system clock signal of the data transmission system.

According to the present invention, in a first data transmission system having a data transmission apparatus and a data receiving apparatus through a network which supplies network clock signals to the data transmission and receiving apparatus, synchronizing signal generation portions in both data transmission and receiving apparatus generate periodical signals generated from the network clock signals having a constant phase relation therebetween. This data transmission apparatus generates time information indicative of data encoding timing in accordance with a system clock signal of the data transmission apparatus and supplies the time information in response to the periodical signal and transmits the time information with data to be transmitted to the data receiving apparatus. The data receiving apparatus detects and holds the time information and uses it for controlling a PLL circuit for generating a system clock signal of the data receiving apparatus such that the system clock signal of the data transmission apparatus is substantially in phase with that of the data receiving apparatus. When an error in the PLL circuit is larger than a controllable range, the time information is loaded into a counter in the PLL circuit. Thus, the PLL circuit operates correctly when there is a jitter of the transmitting data which occurs on packetting data in the ATM network.

According to the present invention there is provided a second data transmission system comprising a data transmission apparatus and a data receiving apparatus coupled to the data transmission apparatus through a network supplying first and second network clock signals to the data transmission apparatus and the data receiving apparatus respectively. The first and second network clock signals have the same frequency and have a first constant phase relation therebetween. This data transmission apparatus has: a first interface portion for transmitting transmission data to the network and receiving the first network clock signal; a first system clock signal generator for generating a first system clock signal having a first frequency; a coding portion responsive to the first system clock signal for receiving and coding data to output coded data; a first synchronizing signal generation portion for generating a first synchronizing signal from the first network clock signal from the first interface portion; a time information generation portion for generating a block of time information for periodically indicating an instance of coding of the data by the coding portion in accordance with the first system clock signal and outputting the block of time information in response to the first synchronizing signal; a combining portion for combining the coded data with the block of time information to supply the transmission data including the coded data and the block of time information to the first interface portion to transmit the transmission data to the network. This data receiving apparatus has a second interface portion for receiving the transmission data and the second network clock signal, a data separating portion responsive to a second system clock signal for separating the received transmission data into received data and a block of second time information; a second synchronizing signal generation portion for generating a second synchronizing signal from the second network clock signal from the second interface portion, the first and second synchronizing signals having the same frequency and having a second constant phase relation therebetween, a second system clock signal generation portion for generating a second system clock signal, and a data decoder responsive to the second system clock signal for decoding the received data to output decoded data. This second system clock signal generation portion has a holding circuit for receiving the block of the second time information and holding at least a block of the second time information and outputting a block of the second time information in response to the second synchronizing signal in order of the block of the second time information received by the holding circuit, and a phase locked loop circuit for generating the second system clock signal by comparing the block of second time information outputted by the holding circuit with the second system clock signal to keep a phase relation between the first and second system clock signals.

In this second data transmission system, the phase locked loop circuit comprises a counter, having a clock pulse input responsive to the second system clock signal, a data load input responsive to the block of the second time information outputted by the holding circuit, and a load timing input responsive to a load timing signal, for counting the second system clock signal to provide a count value and loading the block of the second time information in response to the load timing signal, a first comparator for comparing the block of the second time information outputted by the holding circuit with the count value, an oscillator for generating the second system clock signal in accordance with the result of the first comparator, a second comparator for comparing the count value with a predetermined value, and a gate circuit for generating the load timing signal when the synchronizing signal generation portion generates the second synchronizing signal and the count value exceeds the predetermined value.

According to the present invention there is also provided a data transmission apparatus coupled to a network supplying a network clock signal having a predetermined frequency, comprising a system clock signal generator for generating a system clock signal having a first predetermined frequency, a coding portion for receiving and coding data, a synchronizing signal generation portion for generating a synchronizing signal from the network clock signal to have a second predetermined frequency, a time information generation portion for generating time information for periodically indicating an instance of coding of the data by the coding portion in accordance with the system clock signal and supplying the generated time information in response to the synchronizing signal, and a combining portion for combining the coded data and the time information to generate transmission data and transmitting the transmission data to the network.

According to the present invention there is further provided a data receiving apparatus, coupled to a data transmission apparatus transmitting transmission data, including coded data and a block of first time information indicative of a coding instance of the coded data generated using a first system clock signal having a predetermined frequency supplied in response to a first synchronizing signal produced from the first network clock signal, through a network supplying first and second network clock signals to the data transmission apparatus and the data receiving apparatus respectively, the first and second network clock signals having the same frequency and having a first constant phase relation therebetween, the data receiving apparatus comprising: an interface portion for receiving the transmission data and the network clock signal, a data separating portion responsive to a second system clock signal for separating the received transmission data into received data and a block of second time information, a synchronizing signal generation portion for generating a second synchronizing signal from the second network clock signal from the second interface portion, a system clock signal generation portion having: a holding circuit for receiving the block of second time information and holding at least one block of the second time information and outputting a block of time information from the held at least one block of second time information in response to the second synchronizing signal in order of the block of second time information received by the holding circuit; and a phase locked loop circuit for generating the second system clock signal through comparing the block of second time information From the holding circuit with the second system clock signal in order to keep a phase relation between the first and second system clock signals, and a data decoder responsive to the second system clock signal for decoding the received data to output decoded data.

BRIEF DESCRIPTION OF THE DRAWINGS

The objects and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
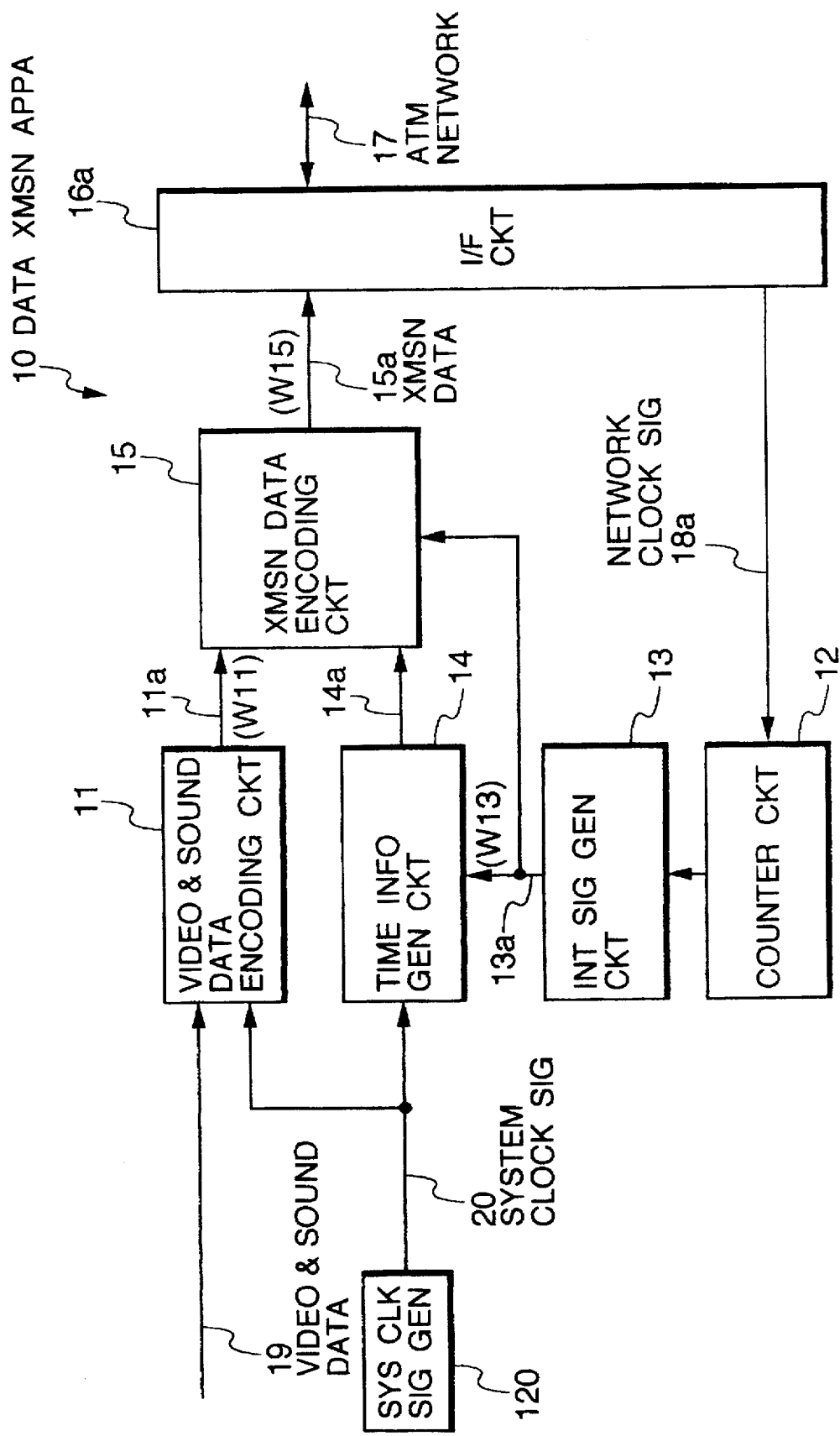
FIG. 1 is a block diagram of an embodiment of a data transmission apparatus used in a data transmission system.
Figure 2:
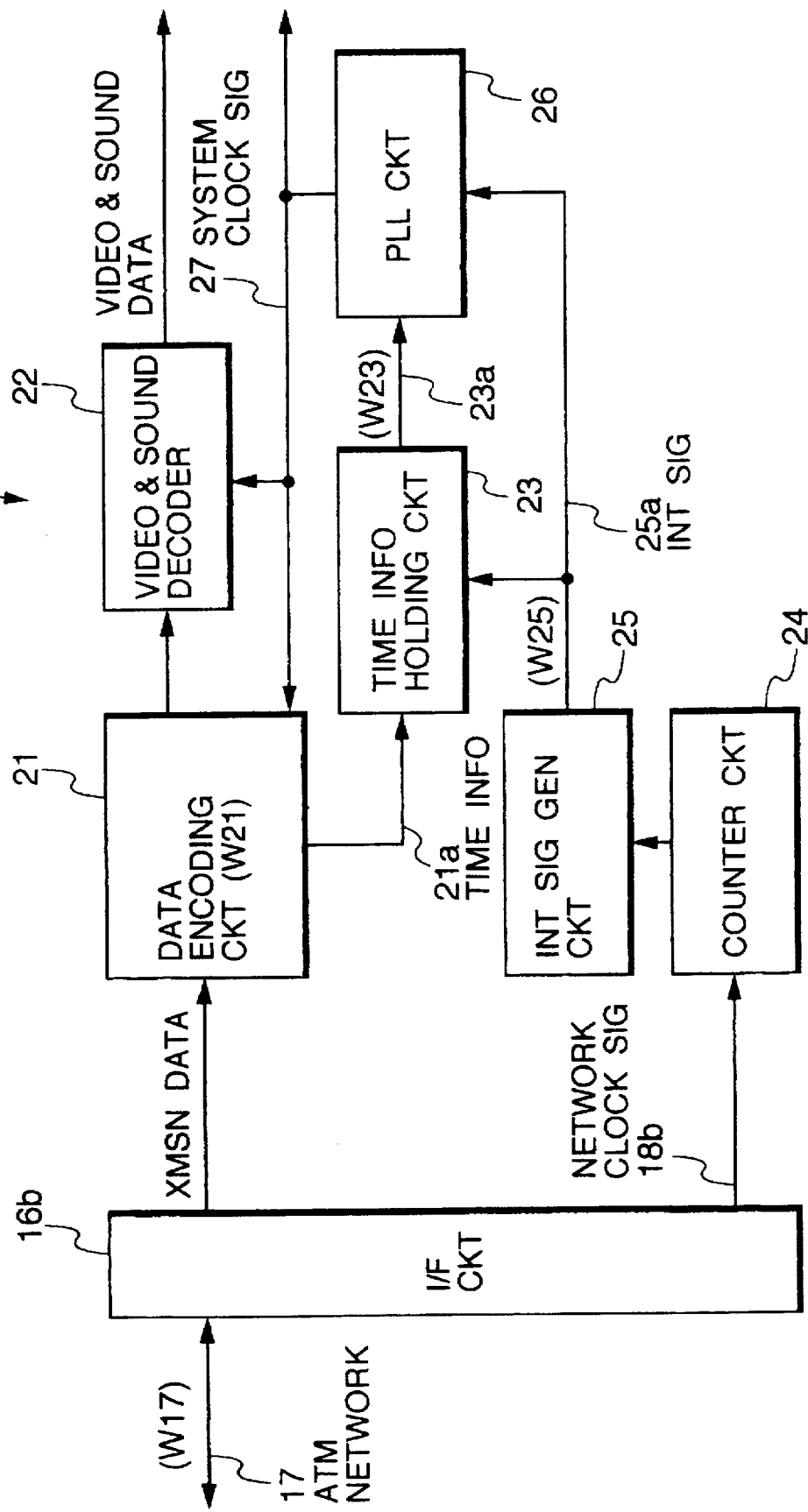
FIG. 2 is a block diagram of an embodiment of a data receiving apparatus used in the data transmission system.
Figure 3:
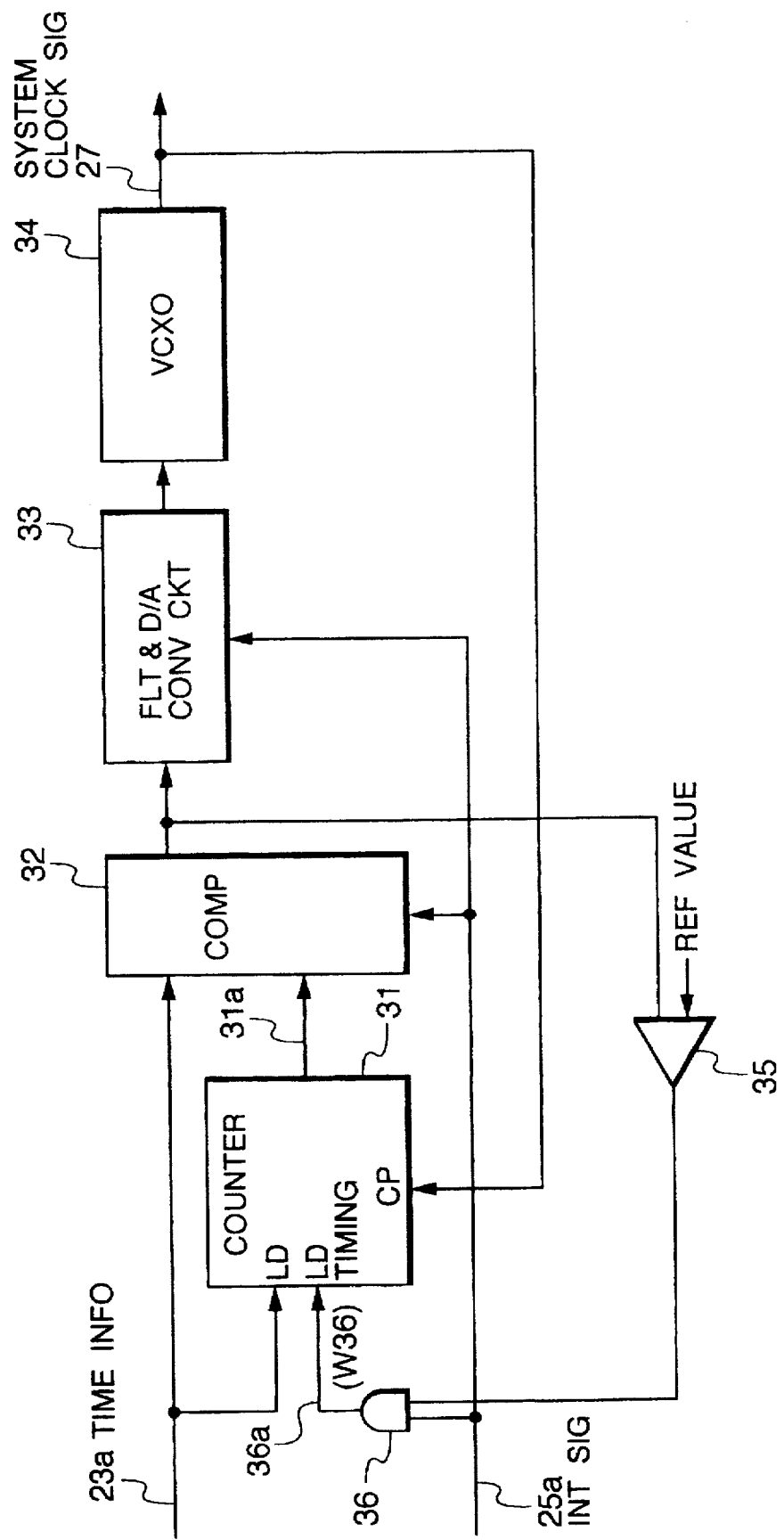
FIG. 3 is a block diagram of this embodiment of a PLL circuit shown in FIG. 2.

FIG. 1 is a block diagram of an embodiment of a data transmission apparatus used in a data transmission system and FIG. 2 is a block diagram of an embodiment of a data receiving apparatus used in the data transmission system. The data transmission apparatus 10 transmits transmission data 16a to the data receiving apparatus 30 through an asynchronous Transfer mode (ATM) network 17. FIG. 3 is a block diagram of this embodiment of a PLL (Phase Locked Loop) circuit used in the data receiving apparatus 30.

The data transmission apparatus 10 of this embodiment comprises an interface circuit 16a for communicating with the ATM network 17, a counter circuit 12 for counting pulses in a network clock signal 18a from the interface circuit 16a, an interruption signal generation circuit 13 for generating a time interruption signal 13a every predetermined interval in response to the counter circuit 12, a time information generation circuit 14 for generating time information in accordance with a system clock 20 of this data transmission apparatus 10 and supplying the time information in response to the time interruption signal 13a, a video and sound encoding circuit 11 for encoding video and sound data 19 in response to the system clock signal 20, and a transmission data encoding circuit 15 for multiplexing the coded video and the sound data 11a from the video and sound data encoding circuit 11 and the time information 14a from the time information generation circuit 14 to transmit the transmission data 15a to the ATM network 17 through the interface circuit 16a, wherein the interface circuit 16a transmits the transmission data 15a to the ATM network 17 and receives the network clock signal 18a.

The video and sound data 19 to be transmitted is supplied to the video and sound data encoding circuit 11. The video and sound data encoding circuit 11 encodes the video and sound data 19 to have the format defined by the MPEG standard in response to the system clock signal 20. The transmission data encoding circuit 15 multiplexes the coded video and the sound data 11a from the video and sound data coding circuit 11 and the time information 14a from the time information generation circuit 14 to produce the transmission data 15a. The interface circuit 16a transmits the transmission data 15a to the ATM network 17. The interface circuit 16a further receives the network clock signal 18a from the ATM network 17. The counter circuit 12 counts pulses in the network clock signal 18a and the interruption signal generation circuit 13 generates the time interruption signal 13a every predetermined interval, for example, every 10 msec or 1 sec.

The time information generation circuit 14 generates the time information in accordance with the system clock 20 of this data transmission apparatus 10 and supplies the time information (time stamp) to the transmission data encoding circuit 15 in response to the time interruption signal 13a. That is, the time information generation circuit 14 comprises a 42-bit counter and counts pulses in the system clock signal 20 having a frequency of 27 MHz, and outputs the counted value as the time information indicative of the instance when the time information generation circuit 14 receives the interruption signal 13a and when the sound and video data are encoded. Therefore, the time information circuit 14 outputs the time information 14a in phase with the network clock signal 18a from the ATM network 17. The transmission data encoding circuit 15 transmits the encoded time information 14a to the ATM network 17 via the interface circuit 16a together with the coded video and sound data 11a as the transmission data 15a through data multiplexing to have a packet transmission.

The data receiving apparatus 30 comprises an interface circuit 16b for communicating with the ATM network 17 and receiving the transmission data, a data decoding circuit 21 for decoding received transmission data from the interface circuit 16b to separate the received transmission data into time information and the encoded video and sound data, a time information holding circuit 23 for receiving the time information from the data decoding circuit 21 and holding the time information, a PLL circuit 26 for generating the system clock signal 27 of the data receiving apparatus 30 with a frequency of the system clock signal 27 controlled by the time information from the time information holding circuit 23, a video and sound decoder 22 for decoding the decoded video and sound data from the decoder 21 in response to the system clock signal 27, a counter circuit 24 for counting pluses in the network clock signal 18b from the interface circuit 16b, and an interruption signal generation circuit 25 for generating an interruption signal 25a supplied to the time information holding circuit 23 and the PLL circuit 26. The data decoding circuit 21 also operates in response to the system clock signal 27.

The interface circuit 16b receives the transmission data from the data transmission apparatus 10. The data decoding circuit 21 demultiplexes the received transmission data from the interface circuit 16b to separate the received transmission data into time information and the encoded video and sound data. The time information holding circuit 23 receives the time information from the data decoding circuit 21 and holds and outputs the time information from the data decoding circuit 21 in response to the interruption signal 25a. The PLL circuit 26 receives the time information from the time information holding circuit 23 in response to the interruption signal 25a and generates the system clock signal 27 of the data receiving apparatus 30 with a frequency of the system clock signal 27 controlled by the time information from the time information holding circuit 23. The video and sound decoder 22 decodes the coded video and sound data from the data decoding circuit 21 in response to the system clock signal 27. The counter circuit 24 counts the pluses in the network clock signal 18b from the interface circuit 16b and the interruption signal generation circuit 25 generates the interruption signal 25a in accordance with the counted value from the counter circuit 24 to have a interruption cycle of 10 msec or 1 msec.

The PLL circuit 26 comprises a counter circuit 31 for counting pulses of the system clock signal 27, a comparator 32 for comparing the time information from the time information holding circuit 23 with the counted value in the counter circuit 31 for generating a frequency control signal in response to the interruption signal 25a, a filter and d/a circuit 33 for integrating the frequency control signal and d/a converting the integrated frequency signal into a voltage frequency control signal, a voltage controlled oscillator 34 for generating the system clock signal 27 with the frequency controlled in accordance with the voltage frequency control signal, a comparator 35 for comparing the counted value with a reference value, and an AND gate 36 for effecting AND operation between the interruption signal 25a and the output of the comparator 35 to supply a load timing signal 36a.

In the PLL circuit 26, the counter circuit 31 counts pulses of the system clock signal 27. The comparator 32 compares the time information 23a from the time information holding circuit 23 with the counted value in the counter circuit 31 every reception of the interruption signal 25a for generating the frequency control signal. The filter and d/a circuit 33 effects a low-pass-filtering operation by integrating the frequency control signal and d/a converting the integrated frequency signal into the voltage frequency control signal. The voltage controlled oscillator 34 generates the system clock signal 27 with the frequency controlled in accordance with the voltage frequency control signal. The system clock signal 27 is supplied to the clock pulse input CP of the counter 31. The comparator 35 compares the counted value with the reference value. The AND gate 36 effects AND operation between the interruption signal 25a and the output of the comparator 35 and supplies the load timing signal to a load timing input of the counter 31. That is, the time information 23a is loaded into the counter 31 when the output of the comparator 32 exceeds the reference value and the interruption signal 23a is generated.

Figure 4:
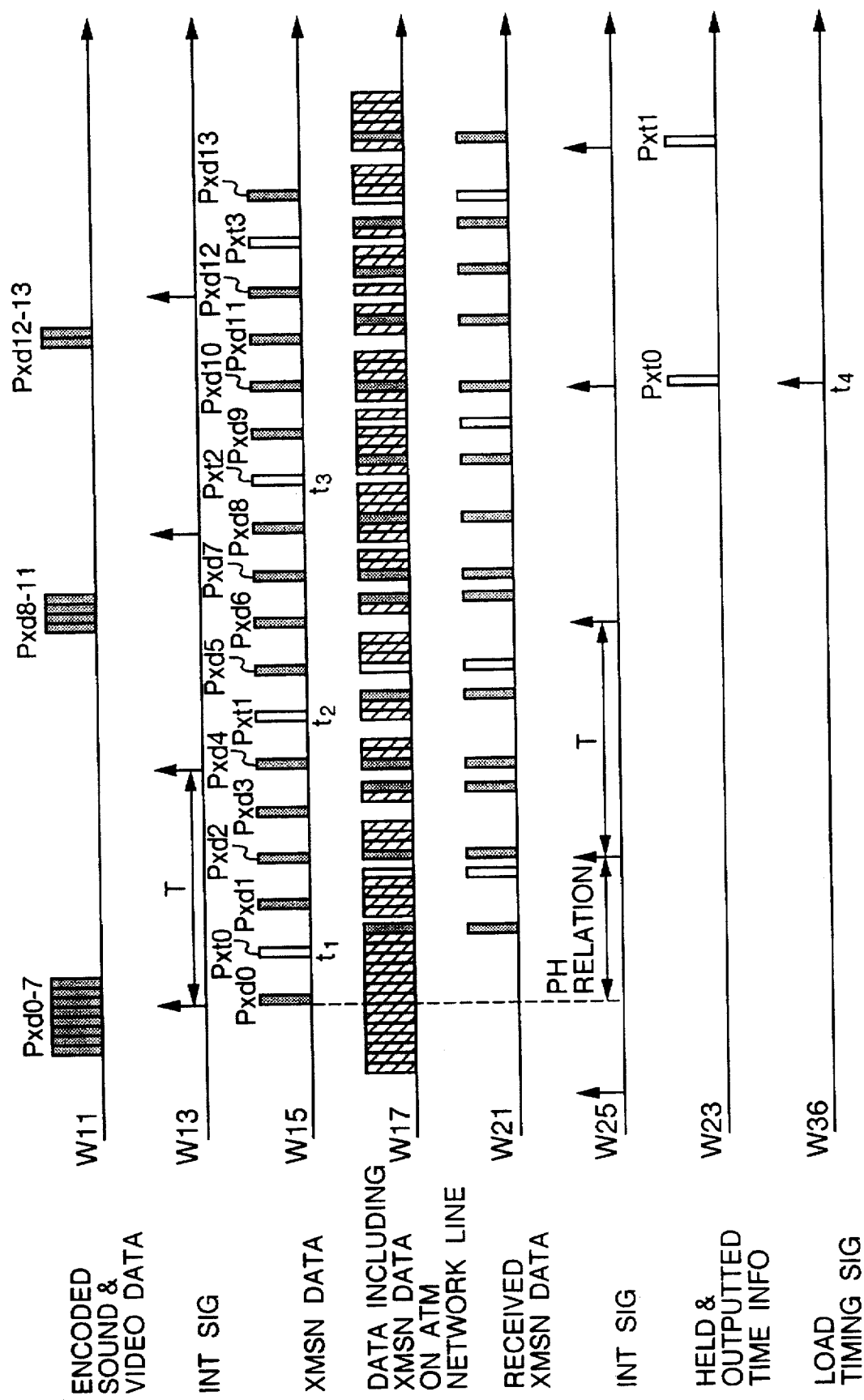
FIG. 4 is a drawing of a time chart of this embodiment representing timings in transmission and receiving of the transmission data and the time information.

The operation of generating the system clock signal 27 will be described more specifically. FIG. 4 is a drawing of a time chart of this embodiment representing timings in transmission and receiving of the transmission data and the time information. References of waveforms in FIG. 4 corresponds to those of the circuits in FIGS. 1, 2, and 3.

The video and sound data encoding circuit 11 encodes the video and sound data to have a plurality of blocks of packets Pxd0–7, Pxd8–11, Pxd12–13 as shown by waveform w11. The transmission data encoding circuit 15 periodically transmits the each of packets Pxd0 to Pxd13. However, the transmission data encoding circuit 15 outputs a block of time information Pxt0 in response to the interruption signal 13a. More specifically, when the transmission data encoding circuit 15 receives the interruption signal 13a during transmission of a packet Pxd0, the transmission data encoding circuit 15 transmits the time information Pxt0 after transmission of the packet Pxd0 as shown by waveform w15. The time information is continuously generated in response to the system clock signal 20 but outputted in response to the interruption signal 13a.

The transmitted packets Pxd0 to Pxd13 and Pxt0 to Pxt3 are sent to the interface circuit 16b together with packets directed to other receiving apparatus as shown by waveform w17.

The data decoding circuit 21 receives the packets Pxd0 to Pxd13 and Pxt0 to Pxt3 with timing of respective received packets shifted as shown in by waveform w21. The video and sound data decoding circuit 22 receives the packets Pxd0 to Pxd13 as the transmission data and decodes the transmission data to reproduce the video and sound data. The time information holding circuit 23 receives a block time information from the decoding circuit 21 and holds at least one block of the time information. That is, at timings t1, t2, and t3, the holding circuit holds blocks of time information (Pxt0 to Pxt2) and outputs the block of the time information (Pxt0) in the order of the blocks of time information received by the time information holding circuit 23. That is, the time information holding circuit 23 holds three blocks of time information and outputs each block of the time information in the first-in-first-out manner in response to the interruption signal 25a as shown by waveform w23.

Figure 5:
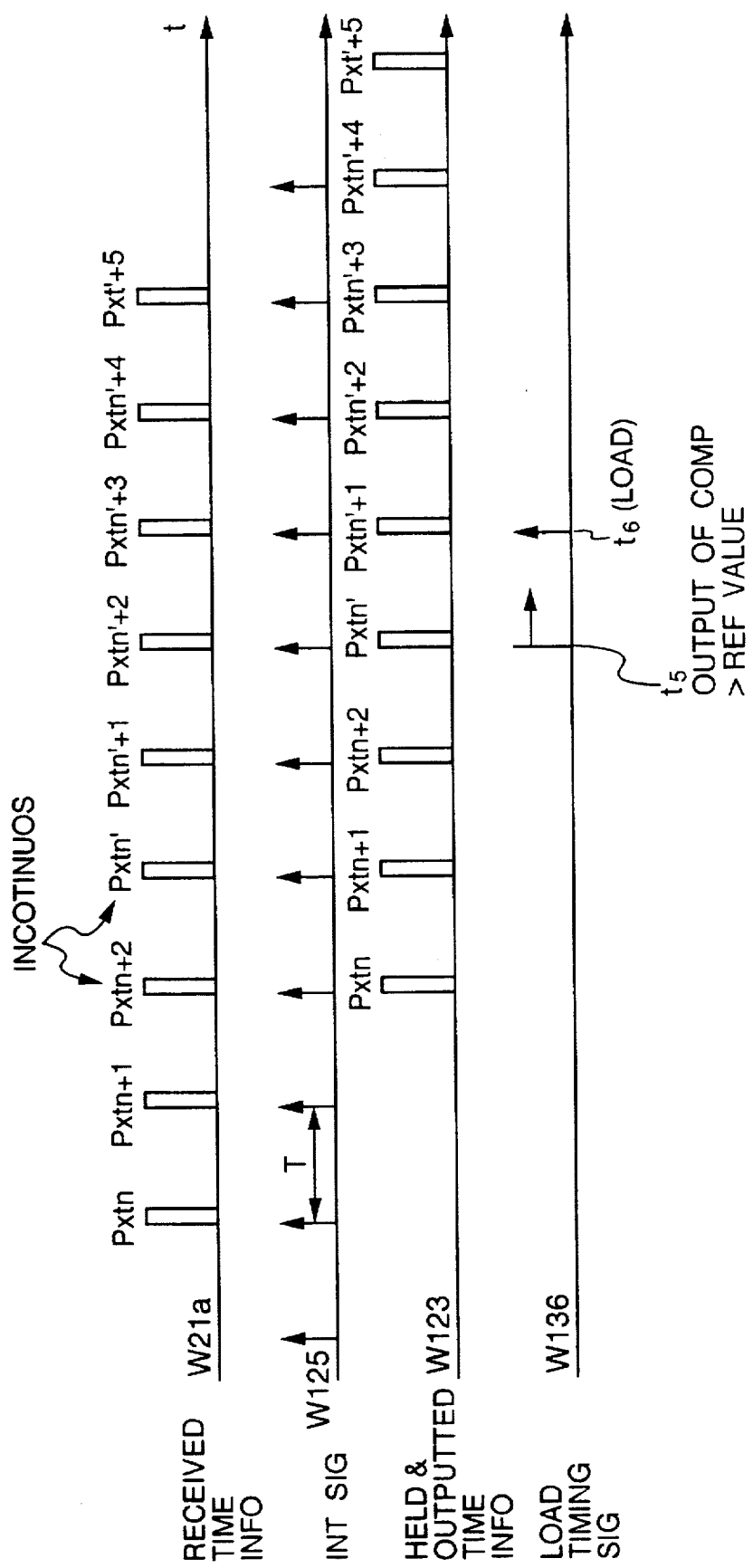
FIG. 5 is a diagram of a time chart illustrating an operation of this embodiment.
Figure 6:
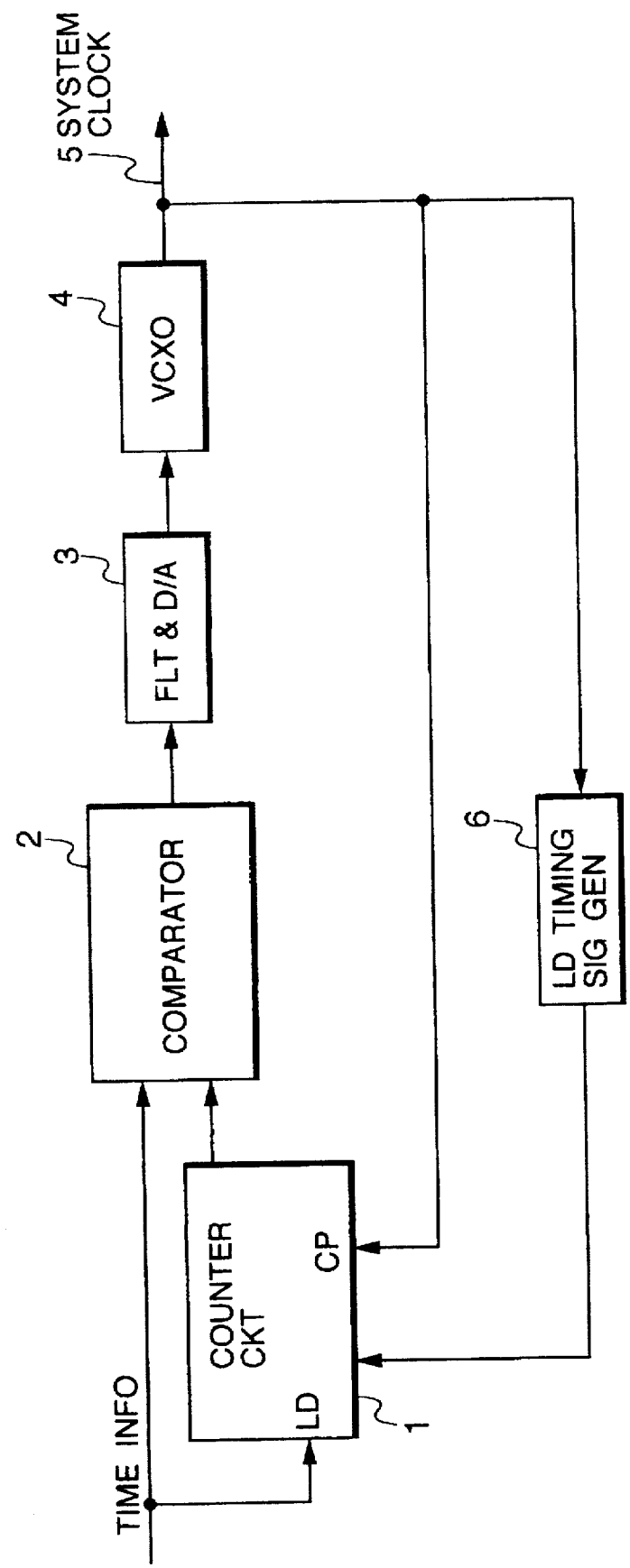
FIG. 6 is a block diagram of a prior art PLL circuit used in a prior art decoder.
Figure 7:
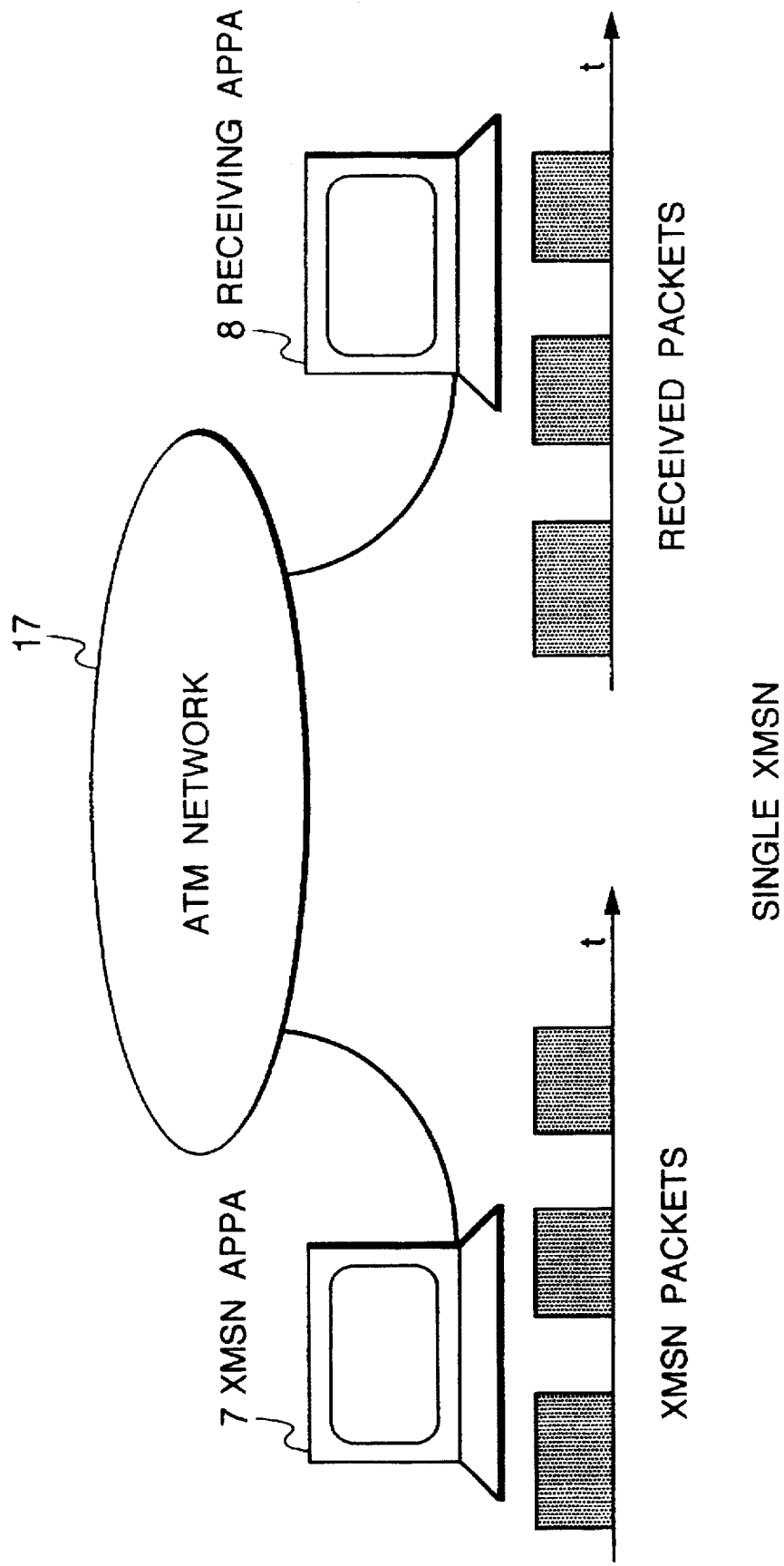
FIG. 7 is an illustration of a prior art transmission system for effecting a high speed packet transmission of data in the ATM through a network in the case that only one transmission apparatus transmits data.
Figure 8:
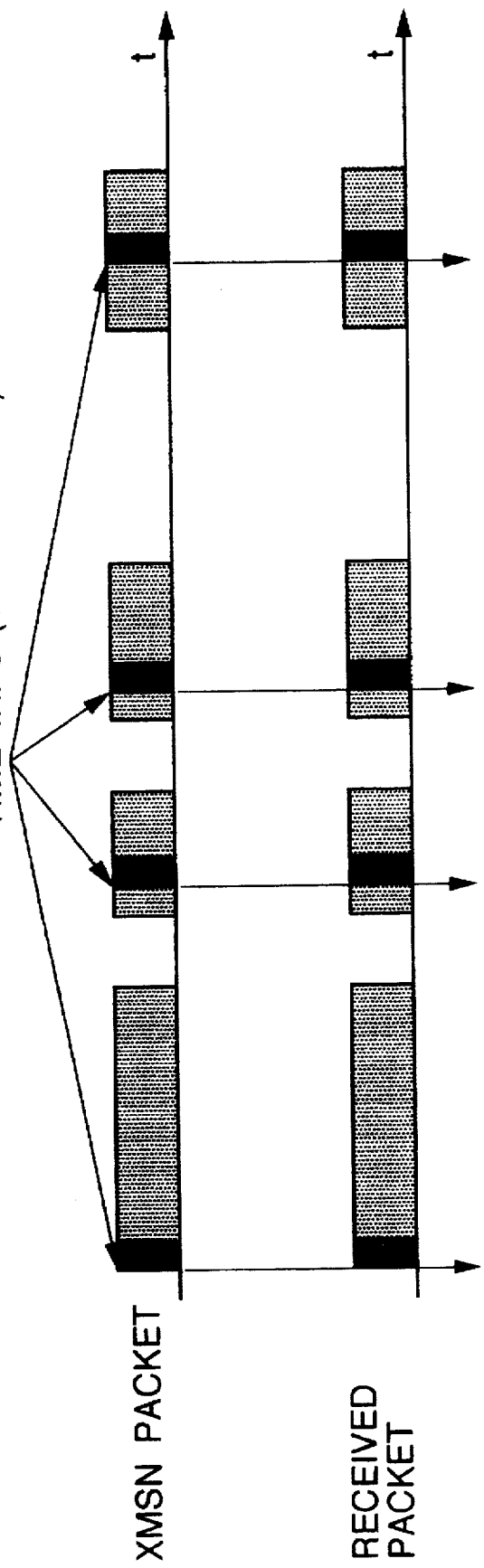
FIG. 8 is a diagram of a time chart of data transmission and data receiving by a prior art data transmission system in the case that only one transmission apparatus transmits data.
Figure 9:
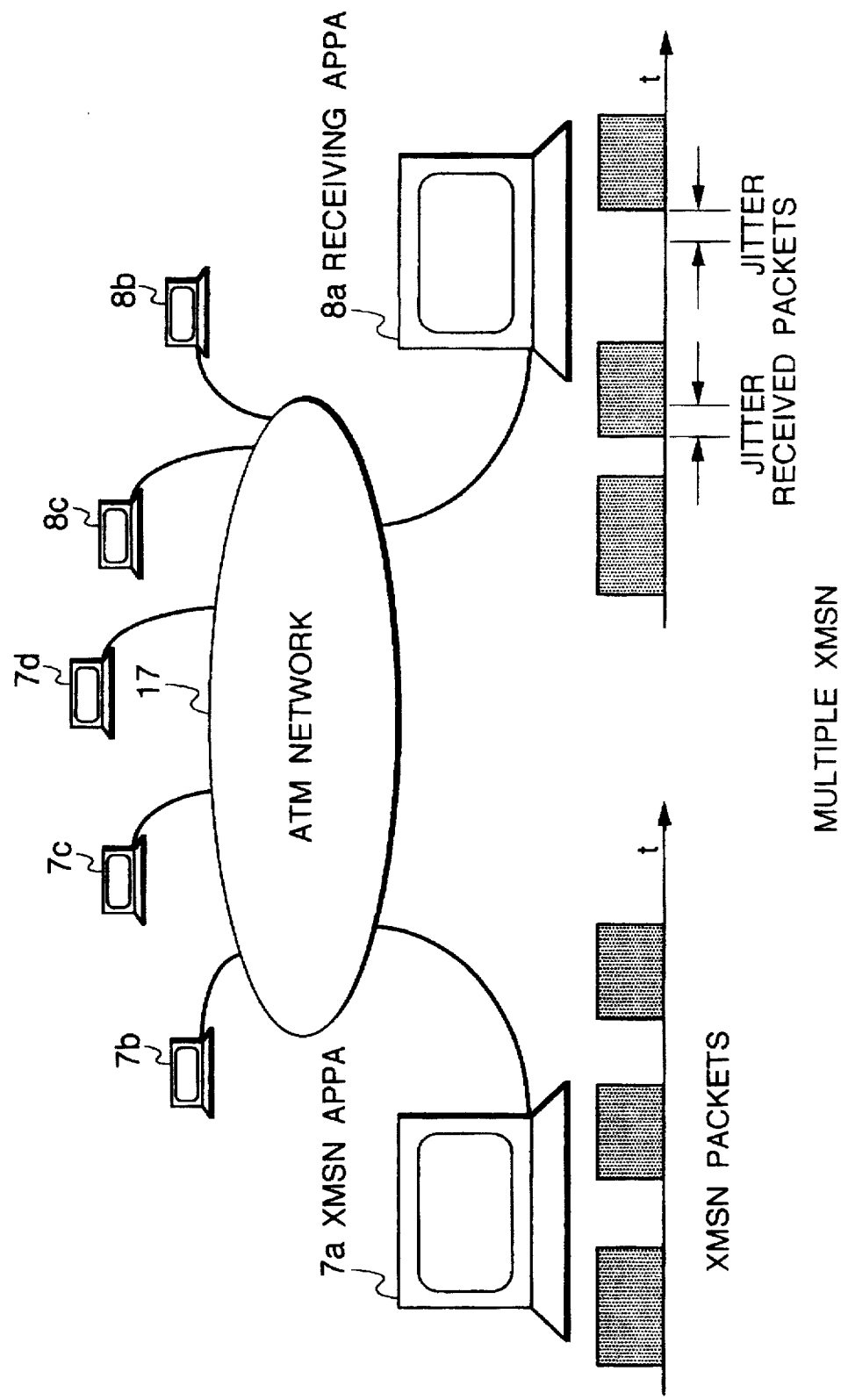
FIG. 9 is an illustration of a prior art transmission system for effecting a high speed packet transmission of data in the asynchronous transfer mode through the network in the case that a plurality of transmission apparatus transmit data at the same time.
Figure 10:
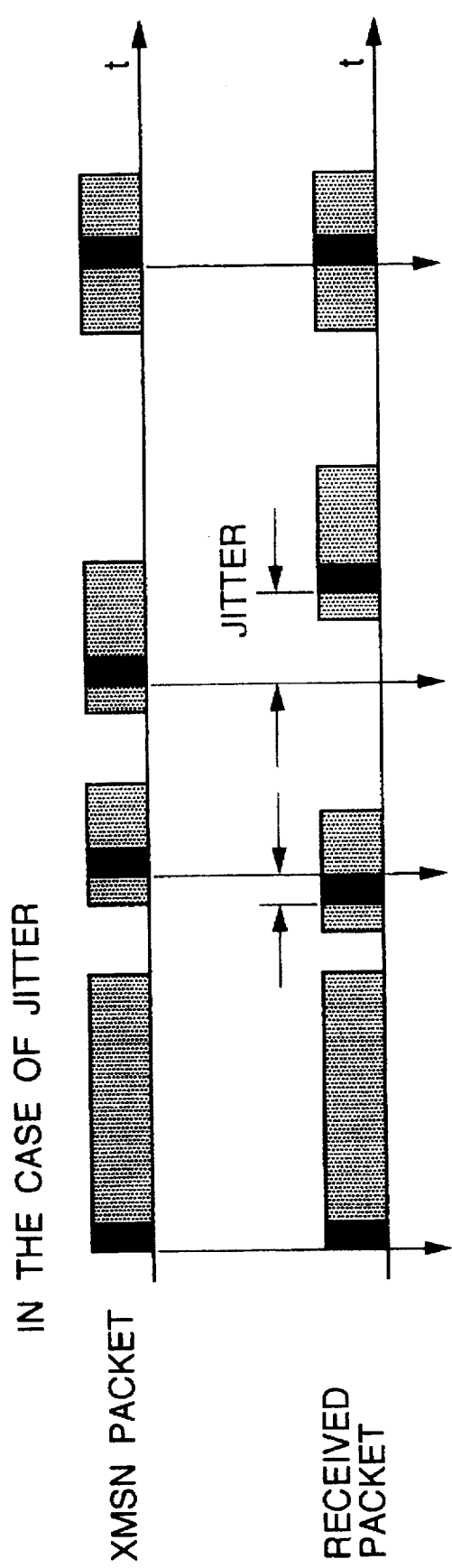
FIG. 10 is a diagram of a time chart of prior art data transmission and data receiving operations by the prior art data transmission system in the case that a plurality of data transmission apparatus transmit data.

The comparator 35 compares the counted value with the reference value and the comparator 35 and the AND gate 36 generates the load timing signal 36a when the counted value exceeds the reference value. That is, when the phase difference between the system clock signal 27 and the time information 23a larger than a controllable range of the PLL circuit 26 and the interruption signal 25a is generated, the load timing signal 36a is generated to load the time information into the counter 31 to control the phase difference between the system clock 27 and the time information within the controllable range. The loading the time information into the counter is made when the transmission system may be in the initial condition or when the phase difference between the first and second clock signals is larger, that is, the phase difference between the time information and the counted value due to a drift in the PLL circuits of the data transmission apparatus 10 and the data receiving apparatus 30 becomes large for a relative long period, for example, more than two days. Moreover, if two consecutive blocks of the time information received by the data receiving apparatus are incontinuos, the load timing signal is also generated. FIG. 5 is a diagram of a time chart illustrating an operation of this embodiment. In FIG. 5, a packet Pxtn+2 and a packet Pxtn of time information are incontinuos in data. Therefore, the difference between the time information from the time information holding circuit 23 and the counted value of the counter 31 becomes larger than the reference value at timing t5 and the load timing signal 36a is generated at timing t6 as shown by waveform w136.

The network clock signal 18a received at the data transmission apparatus 10 has a constant phase relation with the network clock signal 18b received at the data receiving apparatus 30 because it is supplied from the lines included in the same network. Therefore, the time information generated with an accurate cycle in response to the network clock signal 18a in the data transmission apparatus can be accurately reproduced at the data receiving apparatus 30 because the time information holding circuit 23 once holds the time information and outputs in response to the network clock signal 18b having an accurate cycle. Therefore, the time information is periodically inputted into the PLL circuit 26. Moreover, the time information is loaded only when the phase difference between the system clock signals 20 and 27, i.e., the time information and the counted value in the counter 31 is larger than a controllable range of the PLL circuit 26. Therefore, the PLL circuit 26 operates stable.

If the system clock signal 20 of the data transmission apparatus 10 is asynchronous with the system clock signal 27 of the data receiving apparatus, there is a jitter due to the phase difference of the system clock signals 20 and 27. However, this jitter is considerably smaller than the jitter due to the randomly arranged packet of transmission data within a block of packets.

The MPEG standard requires the transmission of time information more than nine times per second. Thus, the interval of transmitting the time information is predetermined between the data transmission apparatus 10 and the data receiving apparatus 30 or it is predetermined that data indicative of the interval of the transmitting the time information is transmitted in a user data region in the data formatted according to the MPEG standard.

As mentioned, the data transmission system comprising the data transmission apparatus 10 and the data receiving apparatus 30 are coupled to the data transmission apparatus through the ATM network 17 which supplies the network clock signals 18a and 18b to the data transmission apparatus 10 and the data receiving apparatus 30 respectively. The network clock signals 18a and 18b have substantially the same frequency and have a first constant phase relation therebetween. The data transmission apparatus 10 has the interface circuit 16a for transmitting transmission data to the ATM network 17 and receives the network clock signal (18a), the system clock signal generator 120 for generating the system clock signal 20 of 27 MHz, the video and sound data encoding circuit 11 responsive to the system clock signal 20 for receiving and encoding data to output encoded video and sound data 11a, the synchronizing signal generation portion including the counter circuit 12 and the interruption signal generation circuit 13 for generating the interruption signal 13a from the network clock signal 18a from the interface circuit 16a, the time information generation circuit 14 for generating a block of time information for periodically indicating an instance of encoding of the data by the video and sound data encoding circuit 11 in accordance with the system clock signal 20 and outputting the block of time information in response to the interruption signal 13a, the transmission data encoding circuit 15 for combining the coded data with the block of time information to supply the transmission data including the encoded data and the block of time information to the interface circuit 16a to transmit the transmission data to the ATM network 17.

The data receiving apparatus 30 has the interface circuit 16b for receiving the transmission data and the network clock signal 18b, the data decoding circuit 21 responsive to the system clock signal 27 for separating the received transmission data into received data and a block of the time information 21a, the interruption signal generation portion, including the counter circuit 24 and the interruption signal generation circuit 25, for generating the interruption signal 25a from the network clock signal 18b from the second interface circuit 16b, the interruption signals 13a and 25a having the same frequency and having a constant phase relation therebetween as shown in FIG. 4, the system clock signal generation portion having: the time information holding circuit 23 for receiving the block of the time information 21a and holding a least a block of the time information 21a and outputting a block of the time information 21a in response to the interruption signal 25a in order of the block of the time information 21a received by the time information holding circuit 23, and the phase locked loop circuit 26 for generating the system clock signal 27 by comparing the block of the time information outputted by the time holding circuit 23 with the system clock signal 27 to keep a phase relation between the system clock signals 20 and 27, and a data decoder responsive to the system clock signal 27 for decoding the received data to output decoded data. The interruption signals 13a and 25a have the same frequency and having the constant phase relation therebetween as shown in FIG. 4 because the network clock signals 18a and 18b have a constant phase relation therebetween as mentioned above.

Moreover, the phase locked loop circuit 26 comprises the counter 31, having the clock pulse input CP responsive to the system clock signal 27, the data load input LD responsive to the block of the time information outputted by the time information holding circuit 23, and the load timing input LD responsive to the load timing signal for counting the system clock signal 27 to provide the count value, the comparator 32 for comparing the block of the time information 23a outputted by the holding circuit with the count value 31a, the voltage controlled oscillator 34 for generating the system clock signal 27 in accordance with the result of the comparator 32, the comparator 35 for comparing the count value with the predetermined value, and the AND gate circuit 36 for generating the load timing signal when interruption signal generation portion generates the interruption signal 25a and the count value exceeds the reference value.

What is claimed is:

1. A data transmission system comprising a data transmission apparatus and a data receiving apparatus coupled to said data transmission apparatus through a network supplying first and second network clock signals to said data transmission apparatus and said data receiving apparatus respectively, said first and second network clock signals having the same frequency and having a first constant phase relation therebetween, said data transmission apparatus having:

a first interface portion for transmitting transmission data to said network and receiving said first network clock signal;

a first system clock signal generator for generating a first system clock signal having a first frequency;

a coding portion responsive to said first system clock signal for receiving and coding data to output coded data;

a first synchronizing signal generation portion for generating a first synchronizing signal from said first network clock signal from said first interface portion;

a time information generation portion for generating a block of time information for periodically indicating an instance of coding of said data by said coding portion in accordance with said first system clock signal and outputting said block of time information in response to said first synchronizing signal;

a combining portion for combining said coded data with said block of time information to supply said transmission data including said coded data and said block of time information to said first interface portion to transmit said transmission data to said network, said data receiving apparatus having:

a second interface portion for receiving said transmission data and said second network clock signal;

a data separating portion responsive to a second system clock signal for separating said received transmission data into received data and a block of second time information;

a second synchronizing signal generation portion for generating a second synchronizing signal from said second network clock signal from said second interface portion, said first and second synchronizing signals having the same frequency and having a second constant phase relation therebetween;

a second system clock signal generation portion having:

a holding circuit for receiving said block of said second time information and holding at least a block of said second time information and outputting a block of said second time information in response to said second synchronizing signal in order of said block of said second time information received by said holding circuit; and a phase locked loop circuit for generating said second system clock signal by comparing said block of second time information outputted by said holding circuit with said second system clock signal to keep a phase relation between said first and second system clock signals; and a data decoder responsive to said second system clock signal for decoding said received data to output decoded data.

2. A data transmission system as claimed in claim 1, wherein said phase locked loop circuit comprises:

a counter, having a clock pulse input responsive to said second system clock signal, a data load input responsive to said block of said second time information outputted by said holding circuit, and a load timing input responsive To a load timing signal, for counting said second system clock signal to provide a count value and loading said block of said second time information in response to said load timing signal;

a first comparator for comparing said block of said second time information outputted by said holding circuit with said count value;

an oscillator for generating said second system clock signal in accordance with the result of said first comparator;

a second comparator for comparing said count value with a predetermined value; and a gate circuit for generating said load timing signal when said synchronizing signal generation portion generates said second synchronizing signal and said count value exceeds said predetermined value.

3. A data transmission apparatus coupled to a network supplying a network clock signal having a predetermined frequency, comprising:

a system clock signal generator for generating a system clock signal having a first predetermined frequency;

a coding portion for receiving and coding data;

a synchronizing signal generation portion for generating a synchronizing signal from said network clock signal to have a second predetermined frequency;

a time information generation portion for generating time information for periodically indicating an instance of coding of said data by said coding portion in accordance with said system clock signal and supplying the generated time information in response to the synchronizing signal; and a combining portion for combining the coded data and said time information to generate transmission data and transmitting the transmission data to said network.

4. A data receiving apparatus, coupled to a data transmission apparatus transmitting transmission data, including coded data and a block of first time information periodically indicating a coding instance of said coded data generated using a first system clock signal having a predetermined frequency supplied in response to a first synchronizing signal produced from said first network clock signal, through a network supplying said first network clock signal and a second network clock signal to said data transmission apparatus and said data receiving apparatus respectively, said first and second network clock signals having the same frequency and having a first constant phase relation therebetween, said data receiving apparatus comprising:

an interface portion for receiving said transmission data and said network clock signal;

a data separating portion responsive to a second system clock signal for separating said received transmission data into received data and a block of second time information;

a synchronizing signal generation portion for generating a second synchronizing signal from said second network clock signal from said second interface portion:

a system clock signal generation portion having:

a holding circuit for receiving said block of second time information and holding at least one block of said second time information and outputting a block of time information from the held at least one block of second time information in response to said second synchronizing signal in order of said block of second time information received by said holding circuit; and a phase locked loop circuit for generating said second system clock signal through comparing said block of second time information from said holding circuit with said second system clock signal in order to keep a phase relation between said first and second system clock signals; and a data decoder responsive to said second system clock signal for decoding said received data to output decoded data.

5. A data receiving apparatus as claimed in claim 4, wherein said phase locked loop circuit comprises:

a counter, having a clock pulse input responsive to said second system clock signal, a data load input responsive to said block of said second time information from said holding circuit, and a load timing input responsive to a load timing signal, for counting said second system clock signal to provide a count value and loading said block of said second time information in response to said load timing signal;

a first comparator for comparing said block of said second time information from said holding circuit with said count value;

an oscillator for generating said second system clock signal in accordance with the result of said first comparator;

a second comparator for comparing said count value with a predetermined value; and a gate circuit for generating said load timing signal when said synchronizing signal generation portion generates said second synchronizing signal and said count value exceeds said predetermined value.

* * * * *